(12) United States Patent
Chi et al.

(10) Patent No.: US 12,520,393 B2
(45) Date of Patent: Jan. 6, 2026

(54) LIGHT EMITTING DEVICE AND CONTROL SYSTEM FOR THE SAME

(71) Applicant: ANAX TECHNOLOGY CORP., Zhubei (TW)

(72) Inventors: Li-Lun Chi, Zhubei (TW);
Chih-Chang Wei, Zhubei (TW);
Jyun-Long Lin, Zhubei (TW);
Ping-Yuan Lin, Zhubei (TW);
Yung-Ting Chen, Zhubei (TW)

(73) Assignee: ANAX TECHNOLOGY CORP., Zhubei (TW)

( * ) Notice: Subject to any disclaimer, the term of this patent is extended or adjusted under 35 U.S.C. 154(b) by 89 days.

(21) Appl. No.: 18/639,554

(22) Filed: Apr. 18, 2024

(65) Prior Publication Data

US 2024/0357718 A1 Oct. 24, 2024

(30) Foreign Application Priority Data

Apr. 21, 2023 (TW) .................................. 112115025

(51) Int. Cl.
| | |
|---|---|
| *H05B 45/14* | (2020.01) |
| *H05B 45/56* | (2020.01) |
| *H05B 47/155* | (2020.01) |
| *H05B 47/165* | (2020.01) |
| *H05B 47/18* | (2020.01) |

(52) U.S. Cl.
CPC ............. *H05B 45/14* (2020.01); *H05B 45/56* (2020.01); *H05B 47/155* (2020.01); *H05B 47/165* (2020.01); *H05B 47/184* (2024.01)

(58) Field of Classification Search
CPC ...... H05B 47/155; H05B 45/48; H05B 45/46; H05B 45/44; H05B 45/40; H05B 45/20; H05B 45/00; H05B 45/14; H05B 45/56; H05B 47/165; H05B 47/184; H05B 47/18; H05B 47/198; F21Y 2115/10; F21W 2121/04; F21V 23/045; F21S 4/10
See application file for complete search history.

(56) References Cited

U.S. PATENT DOCUMENTS

| | | | |
|---|---|---|---|
| 9,739,431 B2 * | 8/2017 | Loomis ................... | H05B 45/48 |
| 2009/0302771 A1 * | 12/2009 | Peng .................... | H05B 47/155 |
| | | | 315/193 |
| 2012/0098444 A1 * | 4/2012 | Peng ...................... | H05B 45/44 |
| | | | 315/193 |

\* cited by examiner

*Primary Examiner* — Renan Luque
(74) *Attorney, Agent, or Firm* — Birch, Stewart, Kolasch & Birch, LLP

(57) ABSTRACT

A control system for a light emitting device includes N number of drive circuits that are connected in series, N number of transmission lines, a common transmission line, a control line electrically connected to the N number of transmission lines and the common transmission line, and a control circuit electrically connected to the control line for outputting a command signal, where N≥2. The command signal is configured for address setting, brightness control or data fetch. The N number of transmission lines are electrically connected to the N number of drive circuits, respectively. Each of the N number of drive circuits has a state setting operable to switch between a transmission state and a non-transmission state. When the state setting of every single one of the N number of drive circuits is in the transmission state, the N number of drive circuits form a pass-through signal transmission path.

20 Claims, 11 Drawing Sheets

Data Fetch Request Data Packet

Response Data Packet

LIGHT EMITTING DEVICE AND CONTROL SYSTEM FOR THE SAME

CROSS-REFERENCE TO RELATED APPLICATION

This application claims priority to Taiwanese Invention Patent Applications No. 112115025, filed on Apr. 21, 2023, the entire disclosure of which is incorporated by reference herein.

FIELD

The disclosure relates to a light emitting device, and a control system for the same.

BACKGROUND

Referring to FIG. 1, a conventional control system for a light emitting device (e.g., a light emitting diode (LED) display) includes a control circuit (C1) and N number of drive circuits (D1 to DN), where N≥2. The control circuit (C1) includes a brightness control (or dimming control) terminal (DIM) for transmitting a brightness control signal, an address setting terminal (ADD) for transmitting an address setting signal, and a feedback terminal (F). Each of the drive circuits (D1 to DN) includes a brightness control receiving terminal (DIP), an address setting receiving terminal (DIS), and an output terminal (DOS). The address setting receiving terminal (DIS) of the drive circuit (D1) is electrically connected to the address setting terminal (ADD) of the control circuit (C1) for receiving the address setting signal therefrom. The drive circuit (D1) generates an address data packet after processing the address setting signal, and transmits the address data packet from the output terminal (DOS) thereof to the address setting receiving terminal (DIS) of the drive circuit (D2). The drive circuit (D2) subsequently processes the address data packet and generates another address data packet to be transmitted to the drive circuit (D3). This process of processing the received address data packet, generating another address data packet and transmitting the generated address data packet to a next one of the drive circuit (D1 to DN) continues until the address setting receiving terminal (DIS) of the last drive circuit (DN) receives an address data packet. The output terminal (DOS) of the last drive circuit (DN) is electrically connected to the feedback terminal (F) of the control circuit (C1). The brightness control receiving terminal (DIP) of each of the drive circuits (D1 to DN) is electrically connected to the brightness control terminal (DIM) of the control circuit (C1) for receiving the brightness control signal therefrom.

One of the disadvantages of the conventional control system is that a wire connection is needed to connect the output terminal (DOS) of the last drive circuit (DN) to the feedback terminal (F). Furthermore, the conventional control system needs the address setting terminal (ADD) and the brightness control terminal (DIM) for the control circuit (C1) to transmit signals, and the feedback terminal (F) to receive signals from the drive circuits (D1 to DN). This not only complicates wiring but also increases input and output settings of the control circuit (C1), particularly when the drive circuits are configured in an M×N matrix configuration and the number of M is large.

SUMMARY

Therefore, an object of the disclosure is to provide a control system for a light emitting device that can alleviate at least one of the drawbacks of the prior art.

According to a first aspect of the disclosure, the control system for a light emitting device includes N number of drive circuits connected in series, N number of transmission lines, a common transmission line, a control line, and a control circuit, where N≥2. Each of the N number of drive circuits includes a first terminal unit, a second terminal unit, and a data terminal. The first terminal unit of an $i^{th}$ one of the N number of drive circuits is electrically connected to the second terminal unit of an $(i-1)^{th}$ one of the N number of drive circuits, where 2≤i≤N. The N number of transmission lines is electrically connected to the data terminals respectively of the N number of drive circuits. The common transmission line is electrically connected to the first terminal unit of a first one of the N number of drive circuits. The control line is electrically connected to the N number of transmission lines and the common transmission line. The control circuit includes a common transceiver terminal that is electrically connected to the control line and that is configured to output a command signal. The command signal is configured for address setting, brightness control or data fetch. The command signal for address setting is configured for sequentially setting assigned addresses respectively for the N number of drive circuits. Each of the N number of drive circuits has a state setting operable to switch between a transmission state and a non-transmission state with respect to signal transmission between the first terminal unit and the second terminal unit. The N number of drive circuits form a pass-through signal transmission path between the first terminal unit of the first one of the N number of drive circuits and the second terminal unit of a last one of the N number of drive circuits when the state setting of every single one of the N number of drive circuits is in the transmission state.

According to a second aspect of the disclosure, the light emitting device includes N number of light emitting diode (LED) groups, where N≥2, and a control system. The control system includes N number of drive circuits, N number of transmission lines, a common transmission line, a control line, and a control circuit. The N number of drive circuits are connected in series and are electrically connected respectively to the N number of LED groups. Each of the N number of drive circuits includes a first terminal unit, a second terminal unit, and a data terminal. The first terminal unit of an $i^{th}$ one of the N number of drive circuits is electrically connected to the second terminal unit of an $(i-1)^{th}$ one of the N number of drive circuits, where 2≤i≤N. The N number of transmission lines are electrically connected to the data terminals respectively of the N number of drive circuits. The common transmission line is electrically connected to the first terminal unit of a first one of the N number of drive circuits. The control line is electrically connected to the N number of transmission lines and the common transmission line. The control circuit includes a common transceiver terminal that is electrically connected to the control line and that is configured to output a command signal. The command signal is configured for address setting. The command signal for address setting is configured for sequentially setting assigned addresses respectively for the N number of drive circuits.

Each of the N number of drive circuits has a state setting operable to switch between a transmission state and a non-transmission state with respect to signal transmission between the first terminal unit and the second terminal unit. For each drive circuit of the N number of drive circuits, when the assigned address of the drive circuit is set, the state setting of the drive circuit is in the transmission state where a signal at the first terminal unit of the drive circuit has content identical to content of a signal at the second terminal unit of the drive circuit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
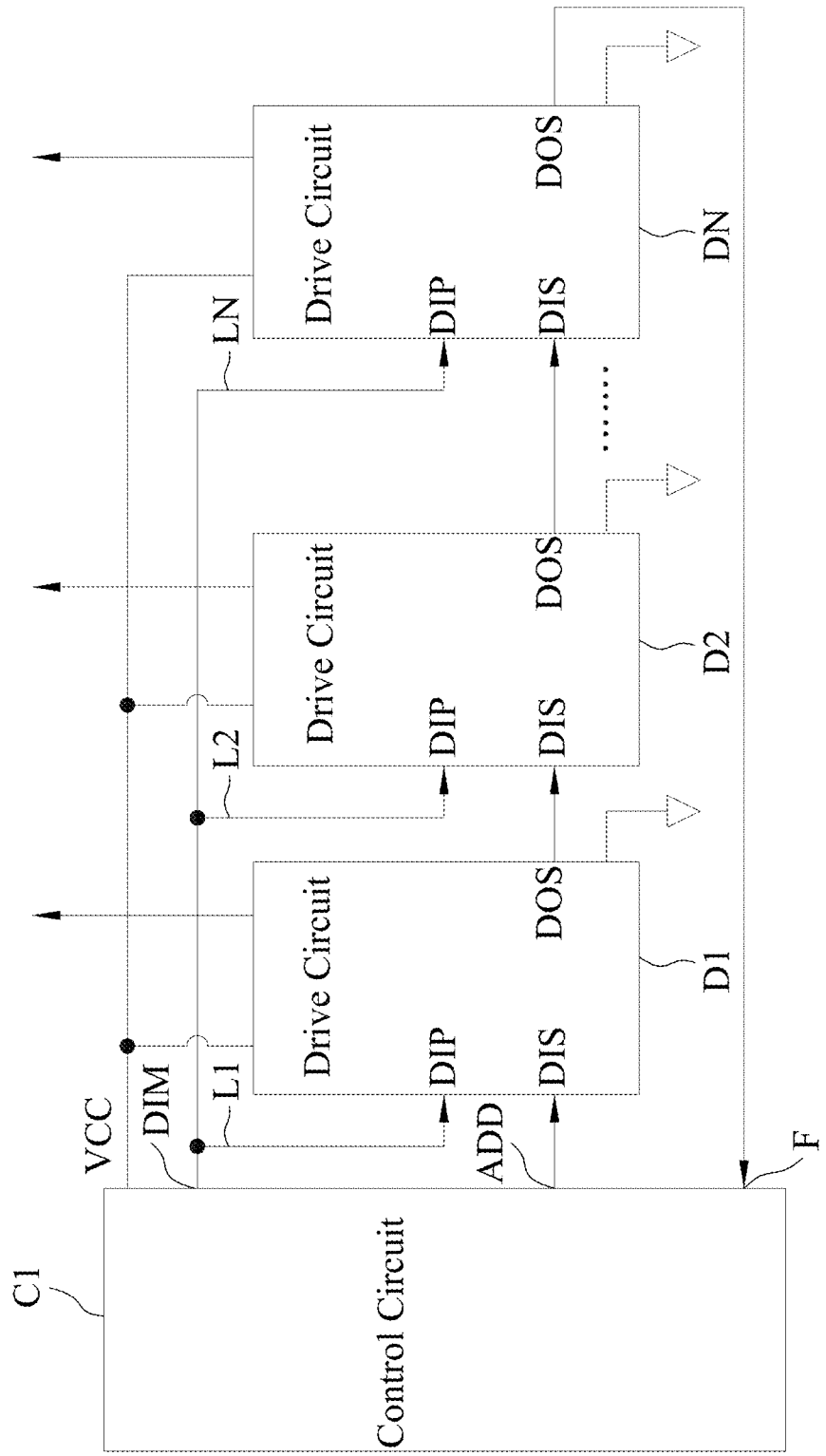
FIG. 1 is a block diagram illustrating a conventional control system for a light emitting device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
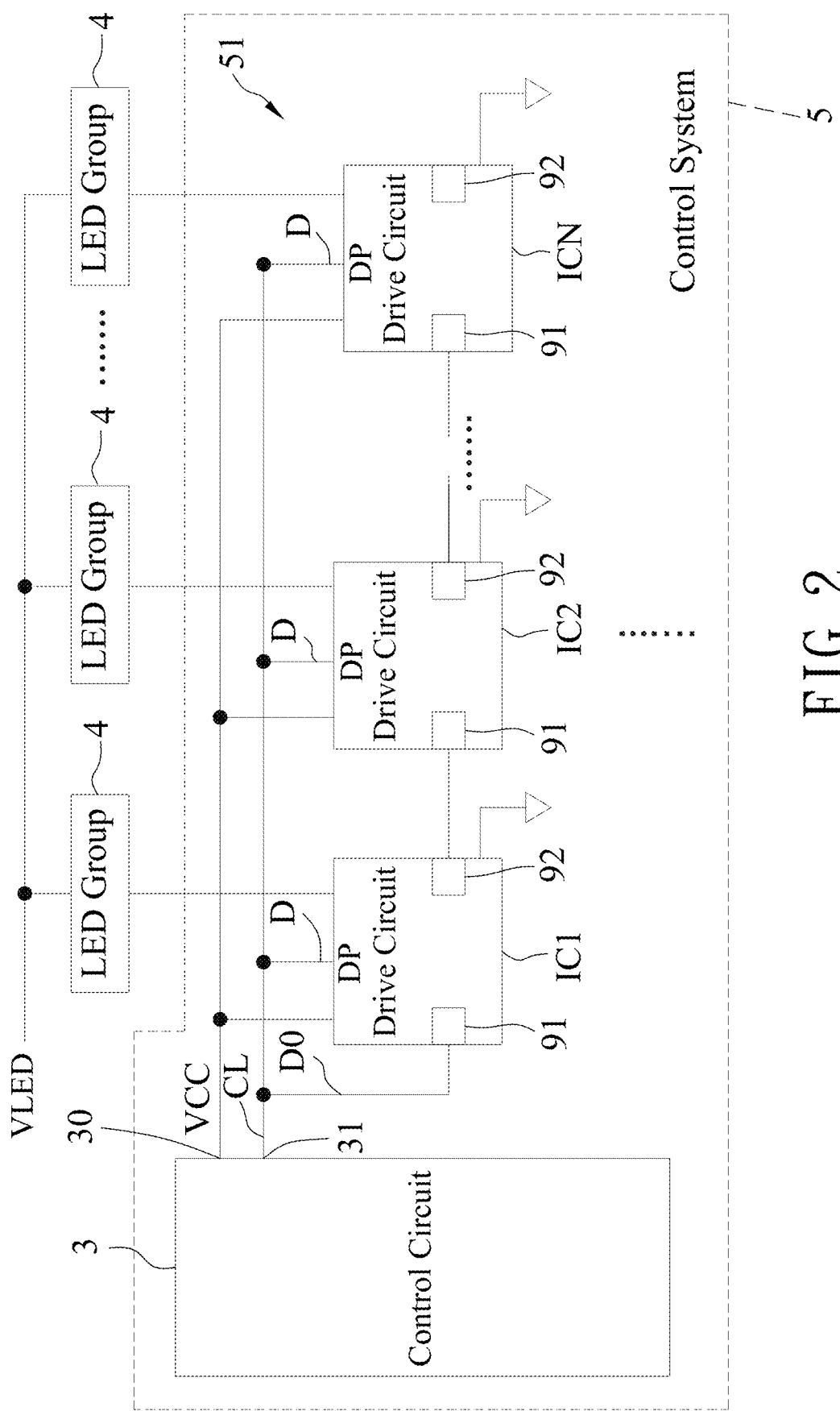
FIG. 2 is a block diagram illustrating a light emitting device and a control system for the same according to a first embodiment of the present disclosure.

Referring to FIG. 2, a light emitting device according to a first embodiment of the present disclosure is exemplified as a light emitting diode (LED) display, and includes N number of LED groups 4 and a control system 5 that is electrically connected to the LED groups 4, where N≥2. The LED groups 4 are disposed to receive a voltage (VLED) from a power supply (not shown).

The control system 5 includes N number of transmission lines (D), a common transmission line (DO), a control line (CL) that is electrically connected to the N number of transmission lines (D) and the common transmission line (DO), a control circuit 3, and M number of drive circuit string(s) 51 each including N number of drive circuits (IC1 to ICN) that are connected in series, where M≥1. Accordingly, there are a total of M×N number of drive circuits (IC1 to ICN), which may be arranged in a matrix configuration. Hereinafter, only one drive circuit string 51 will be described in further detail for the sake of brevity. The LED groups 4 are respectively connected to and controlled by the N number of drive circuits (IC1 to ICN) of the drive circuit string 51 to emit light.

The control circuit 3 includes a power supply terminal 30 that is configured to supply an operating voltage (VCC), and a common transceiver terminal 31 that is electrically connected to the control line (CL) and that is configured to output a command signal (CTRL). The command signal (CTRL) is configured for address setting, brightness control or data fetch, and may be in one of three packet formats, which include a packet format for address setting, a packet format for brightness control, and a packet format for a data fetch. The command signal (CTRL) for address setting is configured for sequentially setting assigned addresses respectively for the N number of drive circuits (IC1 to ICN).

Figure 3:
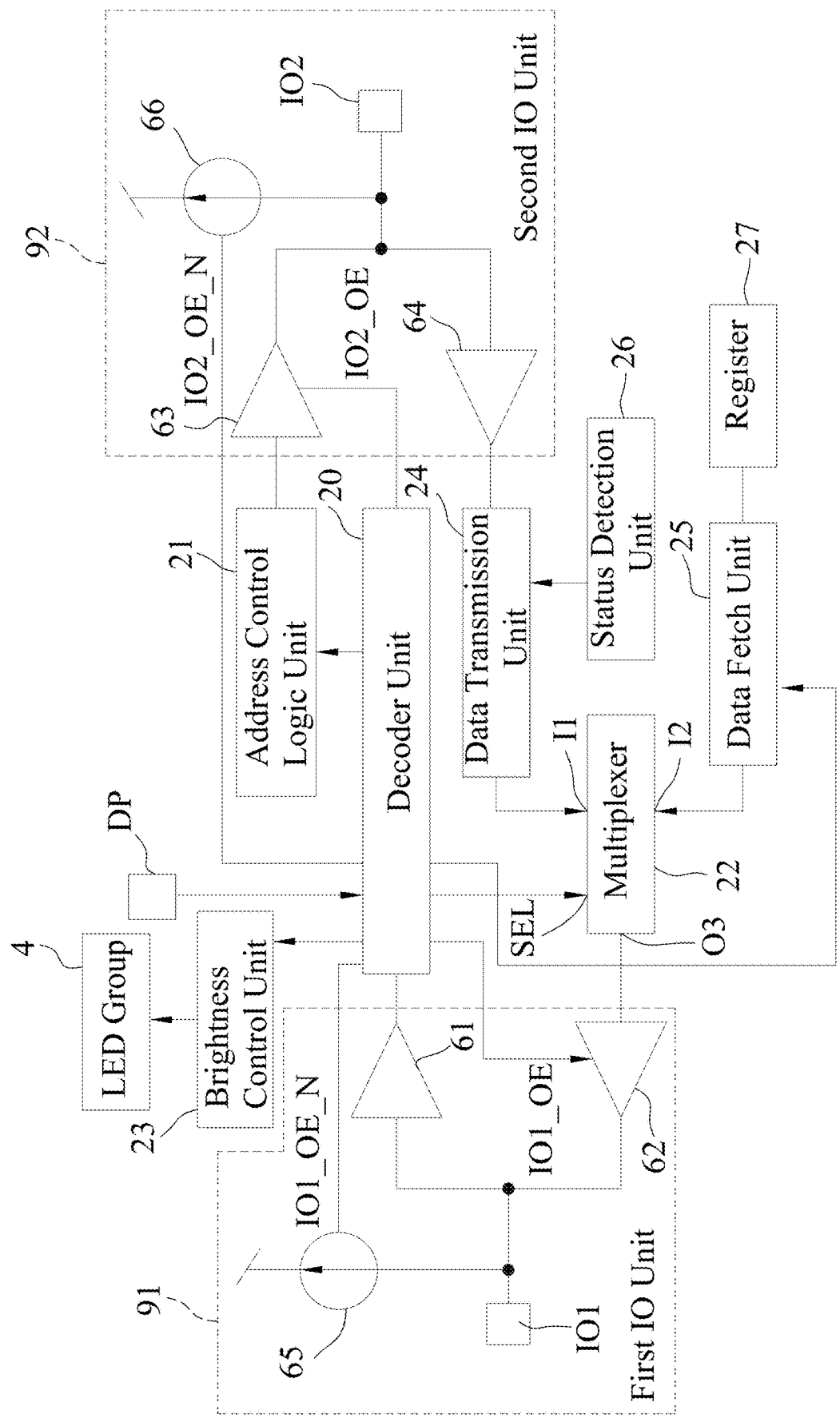
FIG. 3 is a block diagram illustrating a drive circuit of the control system according to the first embodiment of the present disclosure.

Further referring to FIG. 3, each of the N number of drive circuits (IC1 to ICN) includes a first terminal unit 91, a second terminal unit 92, a data terminal (DP), a decoder unit 20, an address control logic unit 21, a multiplexer 22, a brightness control unit 23, a data transmission unit 24, a data fetch unit 25, a status detection unit 26 and a register 27. The decoder unit 20 is electrically connected to the first terminal unit 91 and the second terminal unit 92. The address control logic unit 21 is electrically connected to the decoder unit 20 and the second terminal unit 92. The multiplexer 22 is electrically connected to the first terminal unit 91 and the decoder unit 20. The brightness control unit 23 is electrically connected to the decoder unit 20. The data fetch unit 25 is electrically connected to the multiplexer 22. The register unit 27 is electrically connected to the data fetch unit 25 and is used for storing internal data (e.g., brightness control settings) of a corresponding drive circuit (i.e., the drive circuit that includes the register unit 27). The data transmission unit 24 is electrically connected to the multiplexer 22 and the second terminal unit 92. The status detection unit 26 is electrically connected to the data transmission unit 24.

Each of the N number of drive circuits (IC1 to ICN) has a state setting that is operable to switch between a transmission state and a non-transmission state with respect to signal transmission between the first terminal unit 91 and the second terminal unit 92. The first terminal unit 91 of a first one of the N number of drive circuits (IC1 to ICN) (hereinafter referred to as "first drive circuit (IC1)") is electrically connected to the common transmission line (DO). The first terminal unit 91 of an $i^{th}$ one of the N number of drive circuits (IC1 to ICN) (hereinafter referred to as "$i^{th}$ drive circuit") is electrically connected to the second terminal unit 92 of an $(i-1)^{th}$ one of the N number of drive circuits (IC1 to ICN) (hereinafter referred to as "an $(i-1)^{th}$ drive circuit"), where 2≤i≤N. The N number of transmission lines (D) are electrically connected respectively to the data terminals (DP) respectively of the N number of drive circuits (IC1 to ICN). The connections of internal components within each of the N number of drive circuits (IC1 to ICN) are further described below.

The first terminal unit 91 of each of the N number of drive circuits (IC1 to ICN) includes a first input/output (IO) terminal (IO1), a first buffer 61 that is electrically connected to the first IO terminal (IO1) and the decoder unit 20, a second buffer 62 that is electrically connected to the first IO terminal (IO1), the decoder unit 20 and the multiplexer 22, and a first pull-up unit 65 (e.g., a pull-up resistor) that is electrically connected to a common node of the first buffer 61 and the second buffer 62. The first buffer 61 includes a first buffer-input terminal that is connected to the first IO terminal (IO1), the first pull-up unit 65 and the second buffer 62. The first buffer 61 is configured for transmitting a signal received from the first IO terminal (IO1) to the decoder unit 20. The second buffer 62 is configured for receiving a first-terminal-unit enabling signal (IO1_OE) from the decoder unit 20, and for transmitting a signal received from the multiplexer 22 to the first IO terminal (IO1) based on the first-terminal-unit enabling signal (IO1_OE). For example, when the second buffer 62 receives the first-terminal-unit enabling signal (IO1_OE) that is at a logic level 1 from the decoder unit 20, the second buffer 62 is enabled to transmit the signal received from the multiplexer 22 to the first IO terminal (IO1). The first pull-up unit 65 is configured for receiving a first pull-up enabling signal (IO1_OE_N) that has a logic level opposite to that of the first-terminal-unit enabling signal (IO1_OE). That is to say, when the second buffer 62 receives the first-terminal-unit enabling signal (IO1_OE) that is at a logic level 0, the first pull-up unit 65 receives the first pull-up enabling signal (IO1_OE_N) that is at the logic level 1, which enables the first pull-up unit 65. This configuration prevents a potential level at the first buffer-input terminal of the first buffer 61 from being in a high impedance state.

The second terminal unit 92 of each of the N number of drive circuits (IC1 to ICN) includes a second IO terminal (IO2), a third buffer 63 that is electrically connected to the second IO terminal (IO2), the address control logic unit 21 and the decoder unit 20, a fourth buffer 64 that is electrically connected to the second IO terminal (IO2) and the data transmission unit 24, and a second pull-up unit 66 that is electrically connected to a common node of the third buffer 63 and the fourth buffer 64. The fourth buffer 64 includes a second buffer-input terminal that is electrically connected to the third buffer 63, the second IO terminal (IO2) and the second pull-up unit 66. The fourth buffer 64 is configured for transmitting a signal received from the second IO terminal (IO2) to the data transmission unit 24. The third buffer 63 is configured for receiving a second-terminal-unit enabling signal (IO2_OE) from the decoder unit 20, and for transmitting a signal received from the address control logic unit 21 to the second IO terminal (IO2) based on the second-terminal-unit enabling signal (IO2_OE). For example, when the third buffer 63 receives the second-terminal-unit enabling signal (IO2_OE) that is at a logic level 1 from the decoder unit 20, the third buffer 63 transmits the signal received from the address control logic unit 21 to the second IO terminal (IO2). The second pull-up unit 66 is configured for receiving a second pull-up enabling signal (IO2_OE_N) that has a logic level opposite to that of the second-terminal-unit enabling signal (IO2_OE). That is to say, when the third buffer 63 receives the second-terminal-unit enabling signal (IO2_OE) that is at a logic level 0, the second pull-up unit 66 receives the second pull-up enabling signal (IO2_OE_N) that is at a logic level 1, which enables the second pull-up unit 66. This configuration prevents a potential level at the second buffer-input terminal of the fourth buffer 64 from being in the high impedance state.

The multiplexer 22 includes a first input terminal (I1) that is electrically connected to the data transmission unit 24, a second input terminal (I2) that is electrically connected to the data fetch unit 25, a select terminal (SEL) that is electrically connected to the decoder unit 20, and an output terminal (O3) that is electrically connected to the second buffer 62 of the first terminal unit 91. The multiplexer 22 is configured to select, based on a select signal received by the select terminal (SEL), a signal received by the first input terminal (I1) or a signal received by the second input terminal (I2), and transmit the signal thus selected to the second buffer 62 through the output terminal (O3).

Operation of the N number of drive circuits (IC1 to ICN) in regards to an address setting operation, a state setting operation, a brightness control operation, a data fetch operation, and a status detection and response operation are described below.

Figure 4:
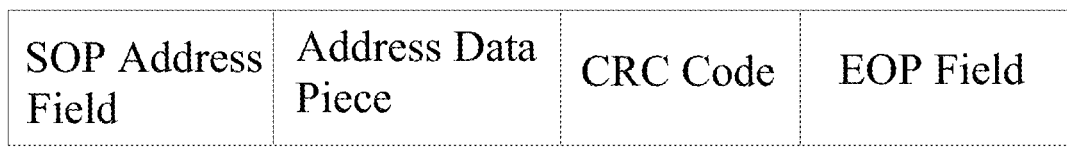
FIG. 4 is a diagram illustrating a packet format of an address setting data packet according to some embodiments of the present disclosure.

For the address setting operation, the common transceiver terminal 31 of the control circuit 3 transmits the command signal (CTRL) that is an address setting signal to the first terminal unit 91 of the first drive circuit (IC1) via the control line (CL) and the common transmission line (D0). The address setting signal includes an address setting data packet. The packet format for the address setting data packet is exemplarily shown in FIG. 4 and includes a Start of Packet (SOP) field for address setting (referred to as "SOP address field") that indicates a start of an address-type data packet, an address data piece that indicates a preset starting address (such as address=1, but not limited to 1), a Cyclic Redundancy Check (CRC) code, and an end-of-packet (EOP) field. The assigned address for the first drive circuit (IC1) is equal to the preset starting address. The assigned address of the $i^{th}$ drive circuit is equal to the preset starting address+(i−1).

Referring to FIGS. 2 and 3, when the decoder unit 20 of the first drive circuit (IC1) receives a command signal (CTRL) from the first IO terminal (IO1) of the first drive circuit (IC1) via the first buffer 61, the decoder unit 20 decodes the command signal (CTRL), determines that the command signal (CTRL) is the address setting signal which includes the address setting data packet based on the SOP address field, and performs a CRC verification (at least to check the address data piece and the CRC code) on the address setting signal. If the CRC verification failed, the address setting operation ends; if the CRC verification is successful, the decoder unit 20 generates and transmits the second-terminal-unit enabling signal (IO2_OE) to the second terminal unit 92 of the first drive circuit (IC1), and transmits the address setting data packet that has been decoded by the decoder unit 20 and that includes the preset starting address to the address control logic unit 21. Upon receiving the second-terminal-unit enabling signal (IO2_OE) from the decoder unit 20, the second terminal unit 92 of the first drive circuit (IC1) transmits a signal received from the address control logic unit 21 of the first drive circuit (IC1) to the first terminal unit 91 of the second one of the N number of drive circuits (IC1 to ICN) (hereinafter referred to as "second drive circuit (IC2)") based on the second-terminal-unit enabling signal (IO2_OE). Specifically, the second-terminal-unit enabling signal (IO2_OE) is received by the third buffer 63 of the second terminal unit 92. The third buffer 63, upon receiving the second-terminal-unit enabling signal (IO2_OE) that is at the logic level 1, is enabled to transmit the signal received from the address control logic unit 21 to the second IO terminal (IO2) of the first drive circuit (IC1), and subsequently to the first IO terminal (IO1) of the second drive circuit (IC2).

The address control logic unit 21 of the first drive circuit (IC1), upon receiving the address setting data packet that includes the preset starting address, performs an automatic address setting operation to set the assigned address of the first drive circuit (IC1) based on the preset starting address, generates a setting address (e.g., by adding one to the assigned address of the first drive circuit (IC1)) for the second drive circuit (IC2), packetizes the setting address for the second drive circuit (IC2) to generate a first serial address output signal, and transmits the first serial address output signal to the second terminal unit 92. In this embodiment, the preset starting address is exemplified as 1. When the preset starting address is 1, the assigned address for the first drive circuit (IC1) is 1, and the setting address that is generated by the first drive circuit (IC1) is 1+1=2. The packet format of the first serial address output signal is identical to the packet format of the address setting data packet, except that a value of the address data piece of the first serial address output signal is 2. Since the decoder unit 20 has already transmitted the second-terminal-unit enabling signal (IO2_OE) that is at the logic level 1 to the third buffer 63, the third buffer 63 is enabled to transmit the first serial address output signal to the second IO terminal (IO2) of the first drive circuit (IC1). Subsequently, the second IO terminal (IO2) of the first drive circuit (IC1) transmits the first serial address output signal to the first IO terminal (IO1) of the second drive circuit (IC2).

Figure 5:
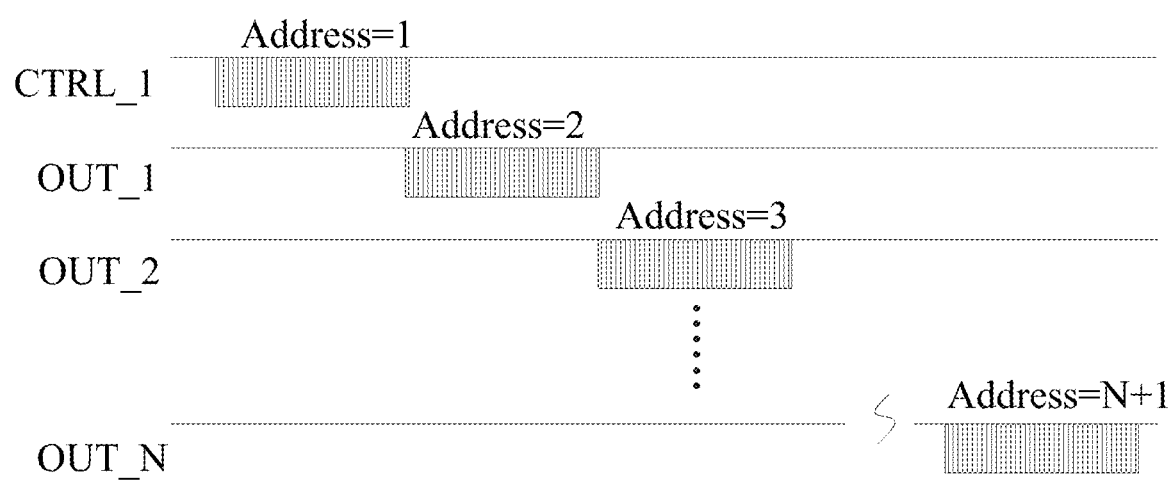
FIG. 5 is a timing diagram of an address setting signal and serial address output signals according to some embodiments of the present disclosure.

Referring to FIGS. 2, 3 and 5, "CTRL_1" denotes a signal that is transmitted from the control circuit 3 to the first terminal unit 91 of the first drive circuit (IC1), and "OUT_1", "OUT_2" and "OUT_N" denote signals that are outputted by the second terminal units 92 respectively of the first drive circuit (IC1), and the second drive circuit (IC2) to the $N^{th}$ one of the N number of drive circuits (IC1 to ICN) (hereinafter referred to as "an $N^{th}$ drive circuit (ICN)"), respectively. When the first IO terminal (IO1) of the second drive circuit (IC2) receives the first serial address output signal (i.e., the signal "OUT_1" in FIG. 5) from the second IO terminal (IO2) of the first drive circuit (IC1), and the CRC verification performed on the first serial address output signal is successful, the address control logic unit 21 of the second drive circuit (IC2) performs the automatic address setting operation that is similar to that of the first drive circuit (IC1) setting the assigned address of the second drive circuit (IC2) based on the setting address of the first serial address output signal, to generate a setting address for a third one of the drive circuits (IC1 to ICN) (hereinafter referred to as "a third drive circuit (IC3)"), packetizes the setting address for the third drive circuit (IC3) to generate a second serial address output signal (i.e., the signal "OUT_2" in FIG. 5), and transmits the second serial address output signal to the third buffer 63 of the second drive circuit (IC2). Similar to the operation in the first drive circuit (IC1), the decoder unit 20 of the second drive circuit (IC2) enables the third buffer 63 to transmit the second serial address output signal to the second IO terminal (IO2) of the second drive circuit (IC2), and subsequently to the first IO terminal (IO1) of the third drive circuit (IC3). In the illustrative embodiment, the assigned address for the second drive circuit (IC2) is 2, and a setting address that is generated by the second drive circuit (IC2) is 2+1=3. The second IO terminal (IO2) of the $(i-1)^{th}$ drive circuit transmits an $(i-1)^{th}$ serial address output signal to the first IO terminal (IO1) of the $i^{th}$ drive circuit, where $2 \leq i \leq N$. The second IO terminal (IO2) of the $N^{th}$ drive circuit (ICN) transmits an $N^{th}$ serial address output signal. For example, if N=20, the $N^{th}$ drive circuit (ICN) generates a twentieth serial address output signal and the address data piece of the twentieth serial address output signal is 20+1=21.

Figure 6:
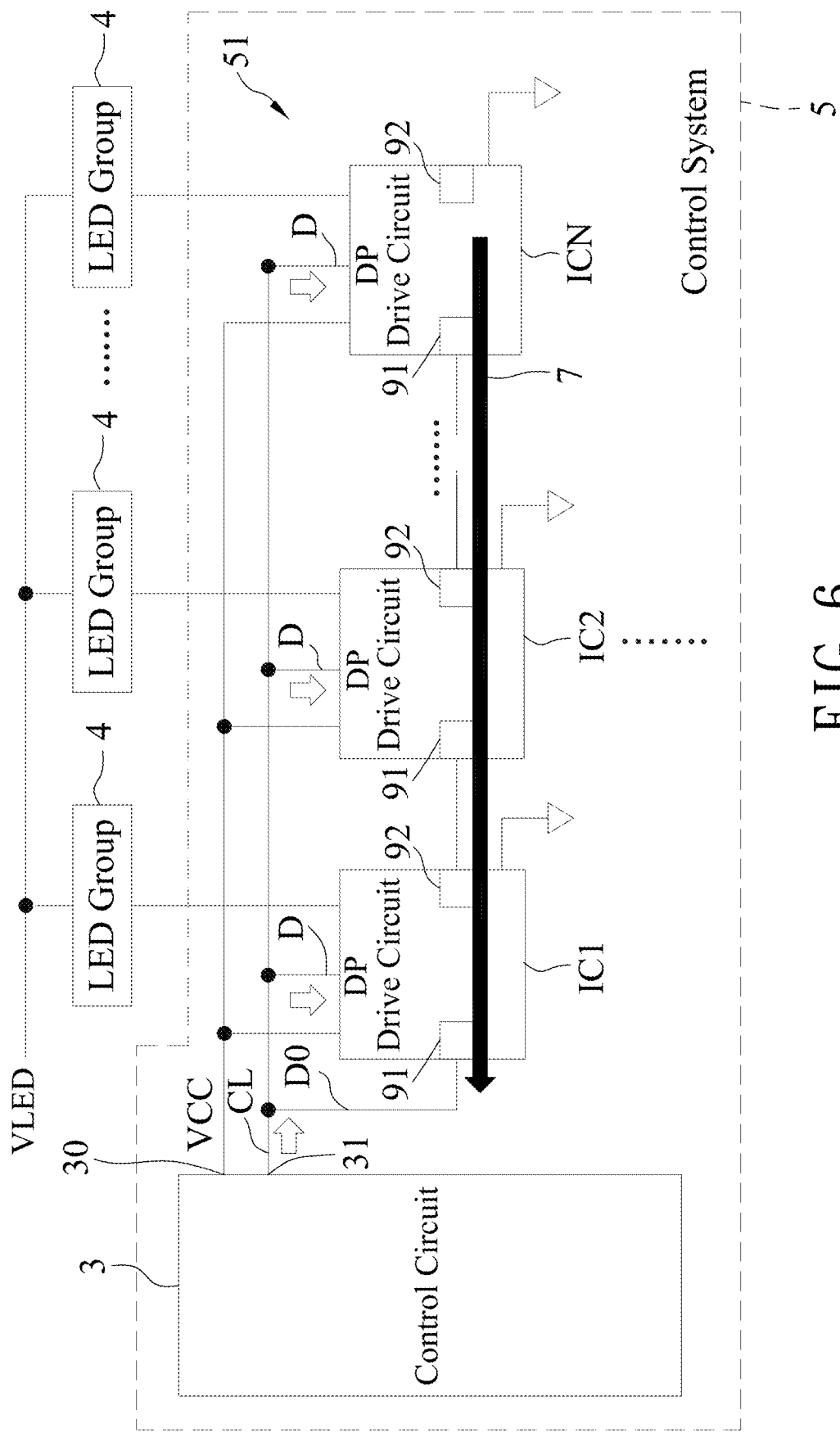
FIG. 6 is a block diagram illustrating a pass-through signal transmission path according to the first embodiment of the present disclosure.
Figure 11:
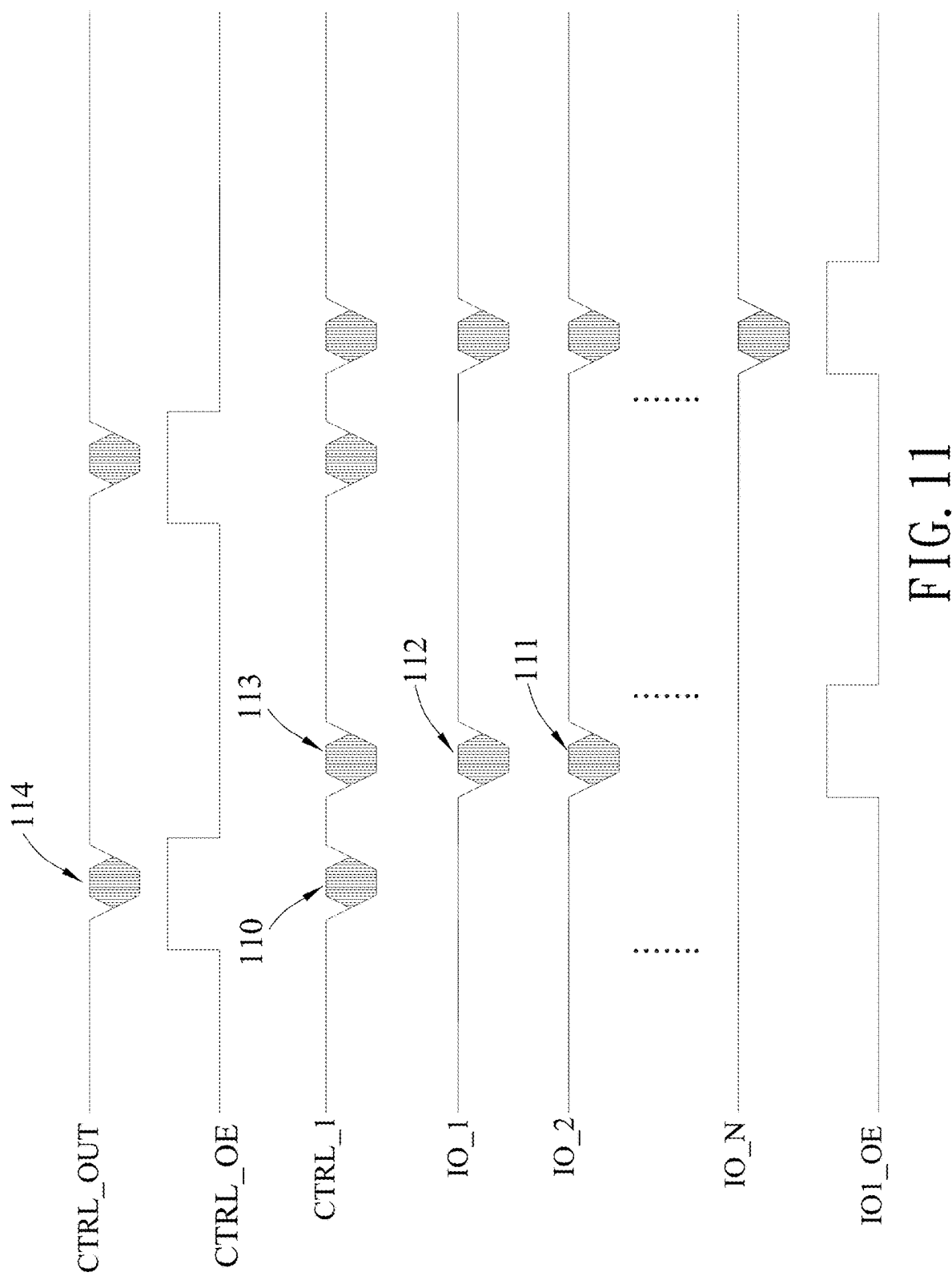
FIG. 11 is a timing diagram of the data fetch request data packets and the response data packets according to the first embodiment of the present disclosure.

Regarding the state setting operation of each of the drive circuits (IC1 to ICN), when and the decoder unit 20 reaches the EOP field of a data fetch signal or a brightness control signal while decoding the command signal (CTRL), the drive circuit switches the state setting of the drive circuit to the transmission state. In the transmission state, a signal outputted by the first terminal unit 91 of the drive circuit is received from the second terminal unit 92 of the drive circuit, and has content identical to content of a signal inputted into the second terminal unit 92 of the drive circuit. The N number of drive circuits (IC1 to ICN) form a pass-through signal transmission path 7 between the first terminal unit 91 of the first drive circuit (IC1) and the second terminal unit 92 of the $N^{th}$ drive circuit (ICN) when the state setting of every single one of the N number of drive circuits (IC1 to ICN) is in the transmission state. The pass-through signal transmission path 7 is formed to allow a signal to be transmitted from the $N^{th}$ drive circuit (ICN) to the first drive circuit (IC1). Referring to FIG. 6, in this embodiment, there is no additional wire used to connect the second terminal unit 92 of the $N^{th}$ drive circuit (ICN) directly to the control circuit 3. Instead, a signal from the drive circuits (IC1 to ICN) is transmitted back to the common transceiver terminal 31 of the control circuit 3 through the pass-through signal transmission path 7. However, in order to prevent a collision of signals between the control circuit 3 and the first drive circuit (IC1) in a case where the control circuit 3 and the first drive circuit (IC1) both output signals to each other at the same time, the control circuit 3 is configured to initiate the switching of the N number of drive circuits (IC1 to ICN) into the transmission state. More specifically, when the decoder unit 20 reaches the EOP field of the data fetch signal or the brightness control signal while decoding the command signal (CTRL) that is transmitted by the control circuit 3, the decoder unit 20 generates the first-terminal-unit enabling signal (IO1_OE) that is at the logic level 1 and continuously transmits the first-terminal-unit enabling signal (IO1_OE) to the first terminal unit 91 of the drive circuit for a preset duration of time or for a specific period of time. For example, a timing diagram of the above-mentioned signals where the command signal (CTRL) is the data fetch signal for the state setting operation is shown in FIG. 11. The preset duration of time is determined by the decoder unit 20, and the specific period of time starts after the decoder unit 20 reaches the EOP field of the data fetch signal or the brightness control signal and ends when a status response signal or a response data packet has been transmitted to the control circuit 3 from the drive circuit.

Referring to FIGS. 2 and 3, when the decoder unit 20 reaches the EOP field of the data fetch signal or the brightness control signal while decoding the command signal (CTRL) that is received from the data terminal (DP), the decoder unit 20 generates and transmits the first-terminal-unit enabling signal (IO1_OE) to the second buffer 62 of the first terminal unit 91, and controls the multiplexer 22 to transmit a signal received from the data transmission unit 24 to the second buffer 62 of the first terminal unit 91. The second buffer 62, upon receiving the first-terminal-unit enabling signal (IO1_OE) that is at the logic level 1, transmits the signal received from the multiplexer 22 to the first IO terminal (IO1). The control circuit 3 is configured to communicate with the decoder unit 20 so as to allow the decoder unit 20 to set the preset duration of time for the decoder unit 20 to generate the first-terminal-unit enabling signal (IO1_OE) with the logic level 1. The preset duration of time may be greater than or equal to a minimum duration of time taken for the N number of drive circuits (IC1 to ICN) to transmit the status response signal or the response data packet to the control circuit 3. When the second buffer 62 is enabled, resulting in the drive circuit to be in the transmission state, each of the N number of drive circuits (IC1 to ICN) forms a closed circuit where a signal is able to be transmitted from the second IO terminal (IO2) of the drive circuit to the first IO terminal (IO1) of the drive circuit through the fourth buffer 64, the data transmission unit 24, the multiplexer 22, and the second buffer 62.

Figure 7:
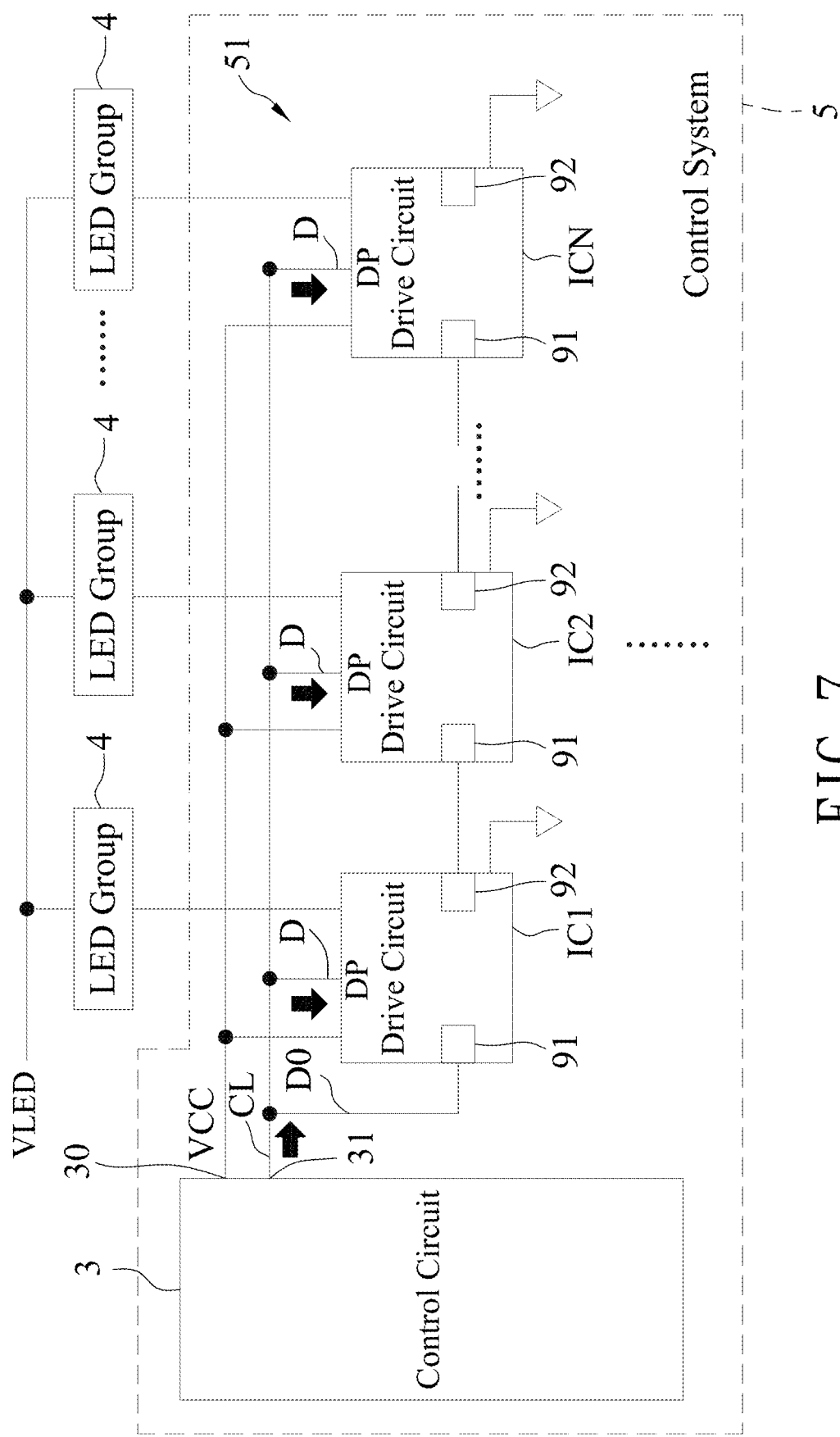
FIG. 7 is a block diagram illustrating a brightness control signal being transmitted to each of a plurality of drive circuits according to the first embodiment of the present disclosure.
Figure 8:
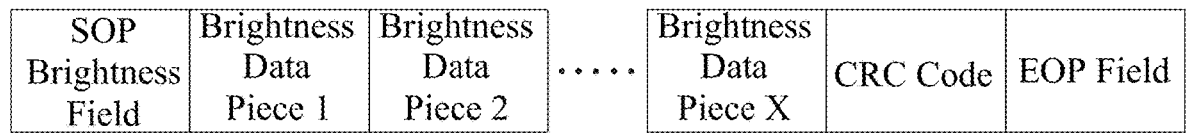
FIG. 8 is a diagram illustrating a packet format of a brightness data packet according to some embodiments of the present disclosure.

Regarding the brightness control operation, referring to FIGS. 3 and 7, the common transceiver terminal 31 of the control circuit 3 is configured to, after the assigned address of each of the N number of drive circuits (IC1 to ICN) is set, transmit the command signal (CTRL) that is the brightness control signal to the data terminals (DP) of the N number of drive circuits (IC1 to ICN) respectively via the N number of transmission lines (D). The decoder unit 20 is electrically connected further to the data terminal (DP) of the drive circuit. The brightness control signal includes a brightness data packet. The packet format of the brightness data packet is exemplarily shown in FIG. 8. The brightness data packet includes an SOP field for brightness control (referred to as SOP brightness field), X number of brightness data piece(s), a CRC code, and an EOP field, where 1≤X≤N, and the X number of brightness data piece(s) correspond respectively to X number of target address(es) of brightness control. Referring to FIGS. 3 and 7, the X number of drive circuits among the N number of drive circuits (IC1 to ICN) are configured to read the brightness data piece(s) according to the assigned addresses of the X number of drive circuits, the assigned address(es) of the X number of drive circuits respectively conforming with the target address(es). In detail, for each drive circuit among the N number of drive circuits (IC1 to ICN), the decoder unit 20 decodes the brightness data packet, and reads one of the brightness data piece(s) that corresponds to one of the target address(es) conforming with the assigned address of the drive circuit. Then the decoder unit 20 sends the one of the brightness data piece(s) to the brightness control unit 23. The brightness control unit 23 generates a driving current based on the one of the brightness data piece(s), and sends the driving current to a respective one of the LED groups 4.

Figure 9:
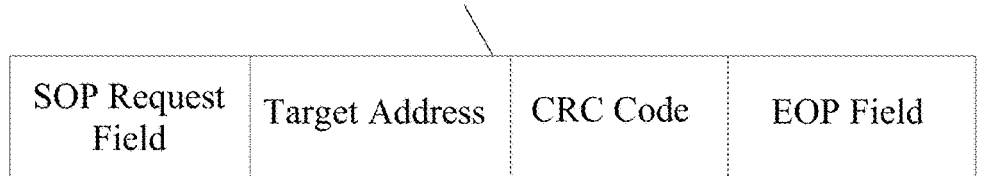
FIG. 9 is a diagram illustrating packet formats of a data fetch request data packet and a response data packet according to some embodiments of the present disclosure.
Figure 9:
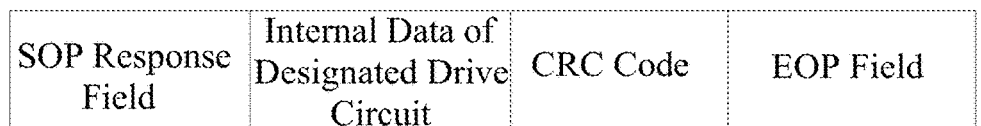

When the control circuit 3 wants to fetch internal data (e.g., a temperature, a voltage headroom, etc.) from one of the N number of drive circuits (IC1 to ICN), the common transceiver terminal 31 of the control circuit 3 transmits the command signal (CTRL) that is the data fetch signal and that includes a data fetch request data packet to the data terminals (DP) of the N number of drive circuits (IC1 to ICN) respectively via the N number of transmission lines (D). Referring to FIG. 9, the data fetch request data packet includes an SOP field for data fetch request (referred to as SOP request field), a target address of data fetch, a CRC code and an EOP field. The target address of data fetch is the assigned address of a designated one of the drive circuits (IC1 to ICN) from which the internal data is to be fetch (e.g., address=2 for fetching data from the second drive circuit (IC2)). For each of the drive circuits (IC1 to ICN), when the drive circuit receives the data fetch request data packet and when the assigned address of the drive circuit conforms with the target address of data fetch, the data fetch unit 25 of the drive circuit generates a response data packet based on the internal data of the designated one of the N number of drive circuits (IC1 to ICN), and transmits the response data packet to the common transceiver terminal 31 of the control circuit 3 via the first terminal unit 91 of the drive circuit, the pass-through signal transmission path 7, the common transmission line (DO) and the control line (CL). Referring to FIG. 9, the response data packet includes an SOP field for response (referred to as "SOP response field"), the internal data of the designated one of the drive circuits (IC1 to ICN), a CRC code, and an EOP field.

In particular, the decoder unit 20 of each of the drive circuit (IC1 to ICN) decodes the data fetch request data packet, and compares the assigned address of the drive circuit with the target address for the data fetch. When the comparison result shows that the assigned address of the drive circuit does not conform with the target address for the data fetch, the drive circuit does not proceed with further actions. When the comparison result shows that the assigned address of the drive circuit conforms with the target address for the data fetch, which means that the drive circuit is the designated one of the drive circuits (IC1 to ICN), the decoder unit 20 of the designated one of the drive circuits (IC1 to ICN) continues with CRC verification. If the CRC verification is successful, the decoder unit 20 transmits the data fetch request data packet that has been decoded to the data fetch unit 25. At the same time, the decoder unit 20 transmits a select signal to the select terminal (SEL) of the multiplexer 22 to control the multiplexer 22 to transmit a signal from the second input terminal (I2) to the output terminal (O3) of the multiplexer 22. The data fetch unit 25 is controlled by the decoder unit 20 to fetch internal data from the register unit 27 based on the data fetch signal that is decoded, and that is received from the data terminal (DP). The data fetch unit 25 then generates a response data packet based on the internal data, and transmits the response data packet to the second input terminal (I2) of the multiplexer 22, and subsequently to the output terminal (O3) of the multiplexer 22. The decoder unit 20 further controls the multiplexer 22 to transmit the response data packet from the data fetch unit 25 to the first terminal unit 91 of the drive circuit. In particular, the multiplexer 22 transmit the response data packet to the first IO terminal (IO1) of the designated one of the drive circuits (IC1 to ICN) via the second buffer 62. The first IO terminal (IO1) subsequently transmits the response data packet to the second IO terminal (IO2) of a previous one of the N number of drive circuits (IC1 to ICN) and finally to the first IO terminal (IO1) of the first drive circuit (IC1) where the respond data packet is transmitted to the common transceiver terminal 31 of the control circuit 3 via the common transmission line (DO) and the control line (CL). It should be noted that a direction of signal flow from the designated one of the drive circuits (IC1 to ICN) to the first drive circuit (IC1) is along the pass-through signal transmission path 7 and in the direction from the $N^{th}$ drive circuit (ICN) to the first drive circuit (IC1).

Figure 10:
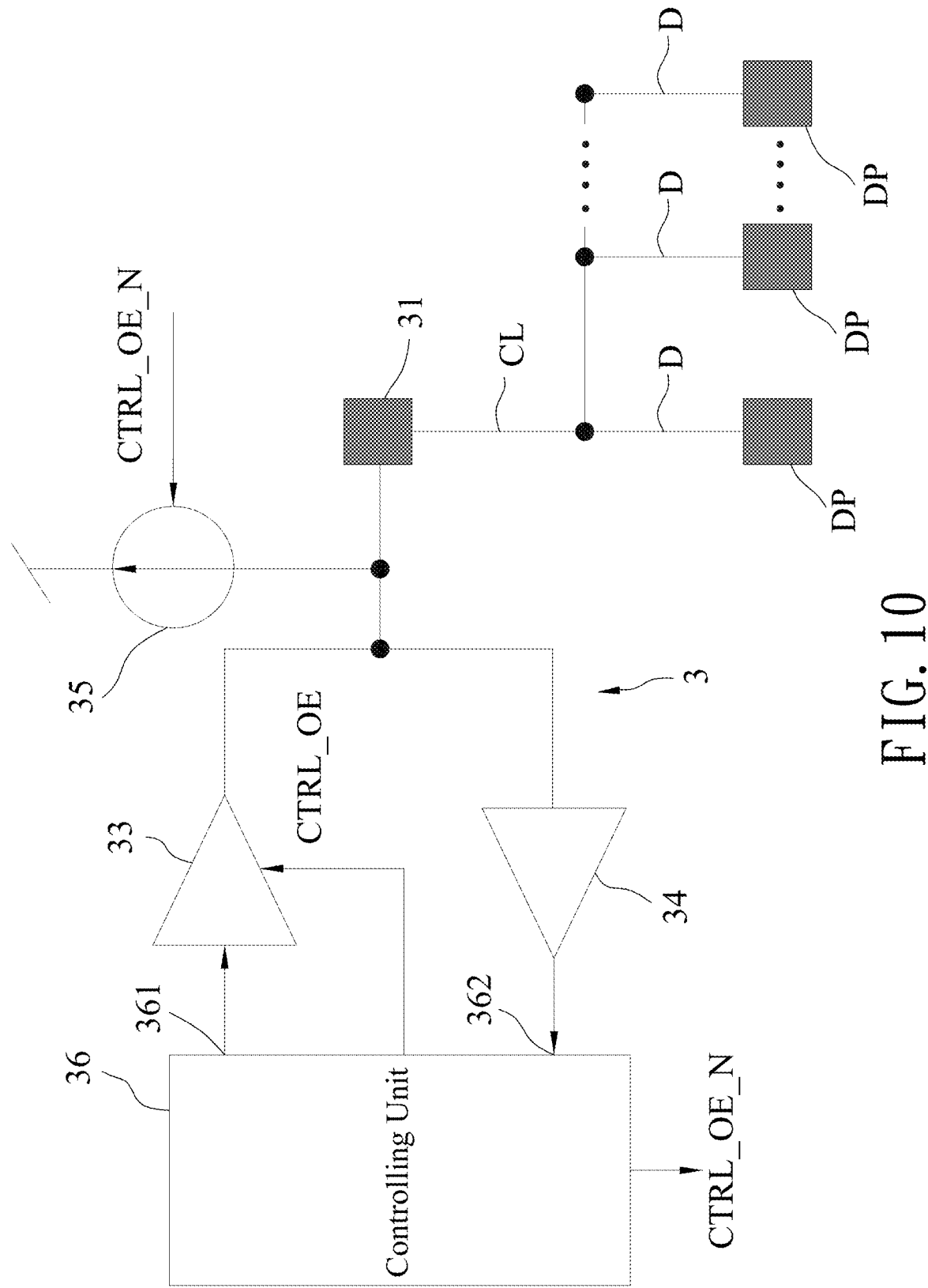
FIG. 10 is a block diagram illustrating a control circuit of the control system according to some embodiments of the present disclosure.

Referring to FIG. 10, the control circuit 3 further includes a controlling unit 36, a fifth buffer 33, a sixth buffer 34 and a third pull-up unit 35. The controlling unit 36 includes a transmitting terminal 361 and a return terminal 362. When the controlling unit 36 wants to fetch data from one of the drive circuits (IC1 to ICN), the controlling unit 36 first generates and transmits a control terminal enabling signal (CTRL_OE) that is at the logic level 1 to the fifth buffer 33 to enable the data fetch signal to be transmitted from the transmitting terminal 361 of the controlling unit 36 to the common transceiver terminal 31, and subsequently to the control line (CL), and to the data terminals (DP) of the N number of drive circuits (IC1 to ICN) respectively via the N number transmission lines (D). At the same time, the controlling unit 36 generates and transmits a third pull-up enabling signal (CTRL_OE_N) that is at the logic level 0 to the third pull-up unit 35 to disable the third pull-up unit 35. After the data fetch request data packet is sent to the N number of drive circuits (IC1 to ICN), the controlling unit 36 generates and transmits a control terminal enabling signal (CTRL_OE) that is at the logic level 0 to the fifth buffer 33 to disable the fifth buffer 33, and the third pull-up enabling signal (CTRL_OE_N) that is at the logic level 1 to the third pull-up unit 35 to enable the third pull-up unit 35. At this time, the controlling unit 36 receives the response data packet of the designated one of the N number of drive circuits (IC1 to ICN) from the common transceiver terminal 31 via the sixth buffer 34 and the return terminal 362.

Referring to FIGS. 7, 10 and 11, "CTRL_OUT" denotes a signal that is outputted by the transmitting terminal 361, "CTRL_OE" denotes the control terminal enabling signal (CTRL_OE) that may be at logic level 1 or 0, "CTRL_1" denotes a signal that is being transmitted on the control line (CL), "IO_1" denotes a signal that is being transmitted on the common transmission line (D0), "IO_2" denotes a signal that is being transmitted between the first drive circuit (IC1) and the second drive circuit (IC2), "IO_N" denotes a signal that is being transmitted between an $(N-1)^{th}$ one of the N number of drive circuits (IC1 to ICN) and the $N^{th}$ drive circuit (ICN), and "IO1_OE" denotes the first-terminal-unit enabling signal (IO1_OE) that may be at logic level 1 or 0. An example of two instances of the data fetch operation is shown in FIG. 11. The first instance is where the controlling unit 36 transmits a data fetch request data packet with the target address of the data fetch that is the assigned address of the second drive circuit (IC2) (i.e., target address of data fetch=2), and the second instance is where the controlling unit 36 transmits a data fetch request data packet with the target address of the data fetch that is the assigned address of the $N^{th}$ drive circuit (ICN) (i.e., target address of data fetch=N). In the first instance, the controlling unit 36 transmits the data fetch signal 114 to the fifth buffer 33. At the same time, the controlling unit 36 transmits the control terminal enabling signal (CTRL_OE) that is the logic level 1 to the fifth buffer 33 to enable the fifth buffer 33 to transmit the data fetch signal 114 to each of the drive circuits (IC1 to ICN). When the second drive circuit (IC2) receives the data fetch request data packet 110 and the CRC verification is successful, the second drive circuit (IC2) generates and transmits a response data packet 111 to the first IO terminal (IO1) of the second drive circuit (IC2) and subsequently to the first drive circuit (IC1). The first drive circuit (IC1) then transmits the response data packet 112 to the common transmission line (DO). Finally, the response data packet 113 is transmitted to the controlling unit 36 via the control line (CL). At this time, the controlling unit 36 transmits the control terminal enabling signal (CTRL_OE) with logic level 0 to the fifth buffer 33 to disable the fifth buffer 33, and the first drive circuit (IC1) transmits the response data packet to the controlling unit 36 via the common transceiver terminal 31 and the sixth buffer 34. In the second instance, a process similar to that of the first instance occurs, only this time the $N^{th}$ drive circuit (ICN) generates and transmits a response data packet from the first IO terminal (IO1) of the $N^{th}$ drive circuit (ICN) to the $(N-1)^{th}$ one of the N number of drive circuits (IC1 to ICN). Subsequently, the response data packet is transmitted to the first drive circuit (IC1) through the $(N-2)^{th}$ one of the N number of drive circuits (IC1 to ICN) to the second drive circuit (IC2) in sequence, and finally to the first IO terminal (IO1) of the first drive circuit (IC1). The first IO terminal (IO1) of the first drive circuit (IC1) then transmits the response data packet to the controlling unit 36 through the common transceiver terminal 31 and the sixth buffer 34.

Regarding the status detection and response operation that may be performed when every single one of the drive circuits (IC1 to ICN) is in the transmission state to form the pass-through signal transmission path 7, the status detection unit 26 of each of the drive circuits (IC1 to ICN) detects an internal situation of the drive circuit, generates a status response signal upon detecting an internal abnormal situation (e.g., overheating, which may be detected using a temperature sensor), and sends the status response signal to the control circuit 3 via the pass-through signal transmission path 7, the common transmission line (DO), and the control line (CL).

Figure 12:
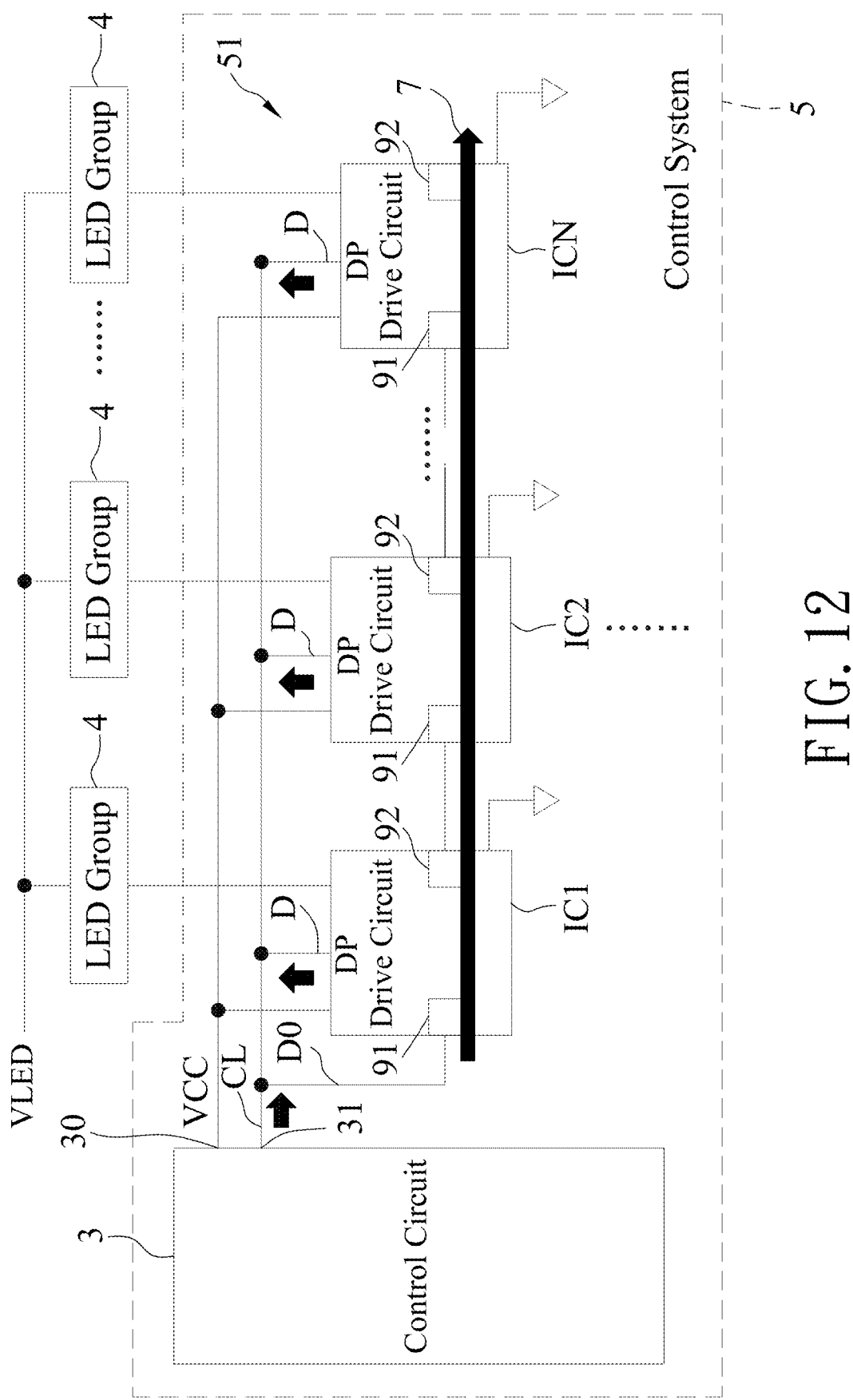
FIG. 12 is a block diagram illustrating the light emitting device and a control system for the same according to a second embodiment of the present disclosure.
Figure 13:
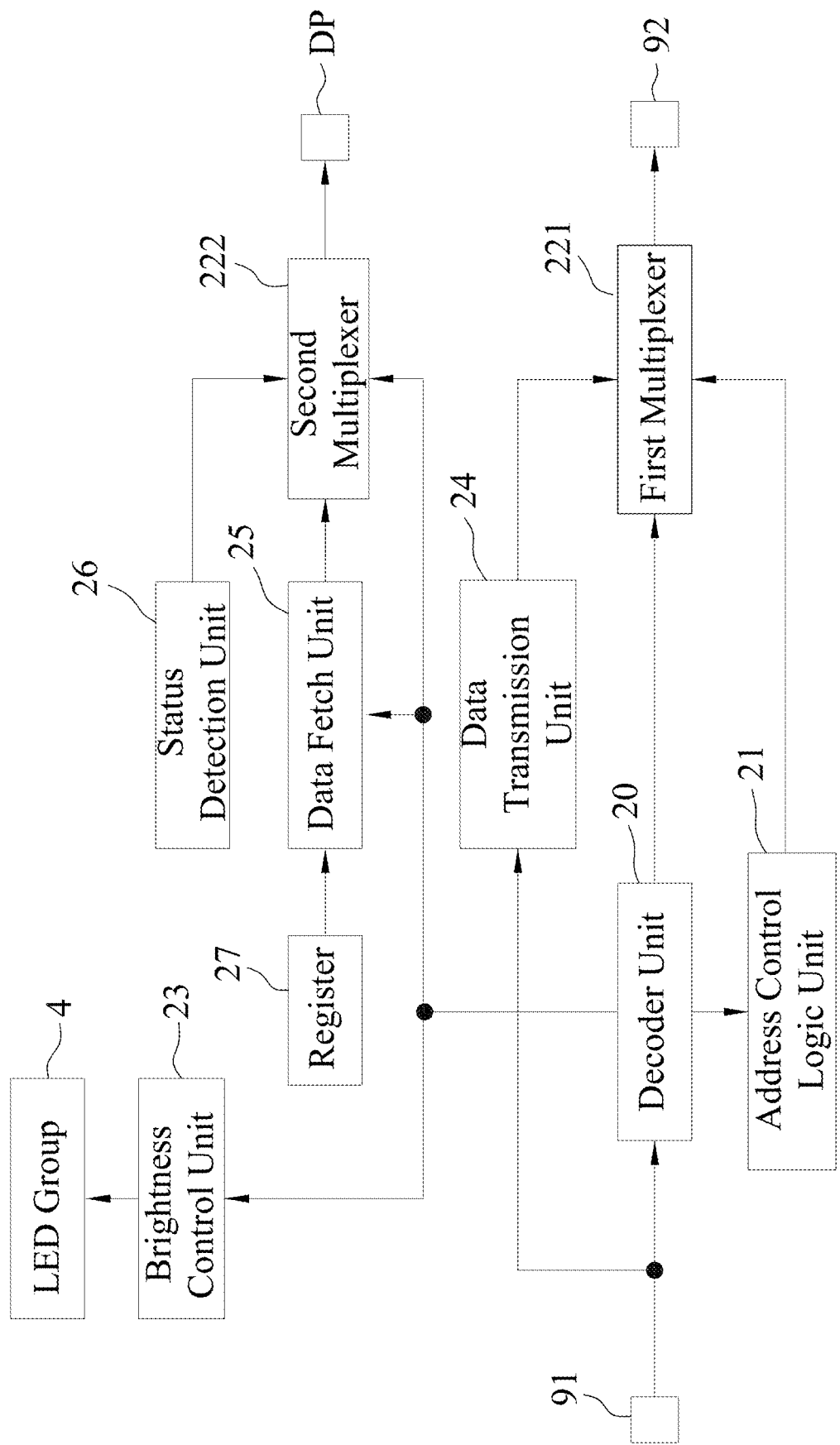
FIG. 13 is a block diagram illustrating the drive circuit according to the second embodiment of the present disclosure.

Referring to FIG. 12, a light emitting device according to a second embodiment of the present disclosure is shown. The second embodiment differs from the first embodiment in the following aspects: the address setting operation, the state setting operation, the brightness control operation, the data fetch operation, the status detection and response operation, and the components of the drive circuits (IC1 to ICN). Referring to FIGS. 12 and 13, each of the drive circuits (IC1 to ICN) includes a first terminal unit 91, a second terminal unit 92, a data terminal (DP), a decoder unit 20 electrically connected to the first terminal unit 91, an address control logic unit 21 electrically connected to the decoder unit 20, a first multiplexer 221 electrically connected to the second terminal unit 92, the decoder unit 20 and the address control logic unit 21, a data transmission unit 24 electrically connected between the first terminal unit 91 and the first multiplexer 221, a brightness control unit 23 electrically connected to the decoder unit 20, a register 27 for storing internal data of the corresponding drive circuit, a data fetch unit 25 electrically connected to the register 27 and the decoder unit 20, a second multiplexer 222 electrically connected to the data terminal (DP), the decoder unit 20 and the data fetch unit 25, and a status detection unit 26 electrically connected to the second multiplexer 222. In this embodiment, the first terminal unit 91 is an input terminal for receiving a signal, and the second terminal unit 92 is an output terminal for outputting a signal.

Referring to FIGS. 12 and 13, regarding the address setting operation according to the second embodiment of the present disclosure, in response to receiving the command signal (CTRL) that is the address setting signal, the decoder unit 20 of a first drive circuit (IC1) controls the first multiplexer 221 to transmit a signal received from the address control logic unit 21 to the second terminal unit 92 of the first drive circuit (IC1). The address setting signal includes a preset starting address for address setting, and the decoder unit 20 is configured to transmit the preset starting address to the address control logic unit 21. The address control logic unit 21, upon receiving the preset setting address from the decoder unit 20, performs an automatic address setting operation to set the assigned address of the first drive circuit (IC1) based on the preset starting address, generates a setting address for a second drive circuit (IC2), packetizes the setting address for the second drive circuit (IC2) to generate a first serial address output signal, and transmits the first serial address output signal to the first multiplexer 221 of the first drive circuit (IC1). The decoder unit 20 then controls the first multiplexer 221 to transmit the first serial address output signal received from the address control logic unit 21 to the second terminal unit 92 of the first drive circuit (IC1). The first serial address output signal is subsequently transmitted to the first terminal unit 91 of the second drive circuit (IC2). When the second drive circuit (IC2) receives the first serial address output signal, the address control logic unit 21 of the second drive circuit (IC2) performs the automatic address setting operation similar to that of the first drive circuit (IC1) for setting the assigned address of the second drive circuit (IC2) based on the setting address of the first serial address output signal, to generate a setting address for a third drive circuit (IC3), packetizes the setting address for the third drive circuit (IC3) to generate a second serial address output signal, and transmits the second serial address output signal to the first multiplexer 221 of the second drive circuit (IC2) and subsequently to the first terminal unit 91 of the third drive circuit (IC3). When the third drive circuit (IC3) receives the second serial address output signal, the address setting operation similar to that of the second drive circuit (IC2) is performed to set the assigned address of the third drive circuit (IC3) and to generate a third serial address output signal. This address setting operation is repeated in the subsequent drive circuits until the $N^{th}$ drive circuit (ICN) receives an $(N-1)^{th}$ serial address output signal and after performing the automatic address setting operation, generates an $N^{th}$ serial address output signal to be transmitted to the first terminal unit 91 of the $N^{th}$ drive circuit (ICN).

Regarding the state setting operation according to the second embodiment of the present disclosure, for each of the drive circuits (IC1 to ICN), when the assigned address of the drive circuit (IC1 to ICN) is set, the state setting of the drive circuit is in the transmission state where a signal outputted by the second terminal unit 92 of the drive circuit is received from the first terminal unit 91 of the drive circuit, and has content identical to content of a signal inputted into the first terminal unit 91 of the drive circuit. The drive circuits (IC1 to ICN) form a pass-through signal transmission path 7 between the first terminal unit 91 of the first drive circuit (IC1) and the second terminal unit 92 of the $N^{th}$ drive circuit (ICN) when the state setting of every single one of the drive circuits (IC1 to ICN) is in the transmission state. In this embodiment, the pass-through signal transmission path 7 is formed to allow a signal to be transmitted from the first drive circuit (IC1) to the $N^{th}$ drive circuit (ICN). In particular, the data transmission unit 24 is configured for transmitting a signal received from the first terminal unit 91 to the first multiplexer 221. For each drive circuit of the N number of drive circuits, the decoder unit 20 controls the first multiplexer 221 to transmit a signal received from the data transmission unit 24 to the second terminal unit 92 of the drive circuit when the drive circuit is in the transmission state.

In the second embodiment, the data fetch operation may be performed when all of the drive circuits (IC1 to ICN) are in the transmission state to form the pass-through signal transmission path 7. In the data fetch operation, the common transceiver terminal 31 of the control circuit 3 transmits the data fetch signal to each of the drive circuits (IC1 to ICN) via the control line (CL), the common transmission line (D0) and the pass-through signal transmission path 7. The data fetch request data packet includes a target address of data fetch that is the assigned address of a designated one of the N number of drive circuits (IC1 to ICN). For each of the drive circuits (IC1 to ICN), when the drive circuit receives the data fetch request data packet and when the assigned address of the drive circuit conforms with the target address of data fetch, the data fetch unit 25 of the drive circuit generates and transmits a response data packet to the common transceiver terminal 31 of the control circuit 3 via the data terminal (DP) of the drive circuit, the transmission line (D) of the drive circuit, and the control line (CL). The response data packet includes internal data related to the designated one of the N number of drive circuits (IC1 to ICN). In particular, the decoder unit 20 of the drive circuit controls the data fetch unit 25 to fetch internal data from the register unit 27 based on the data fetch signal that is received from the first terminal unit 91 of the drive circuit. The data fetch unit 25 then generates a response data packet based on the internal data, and transmits the response data packet to the second multiplexer 222. At the same time, the decoder unit 20 controls the second multiplexer 222 to transmit the response data packet received from the data fetch unit 25 to the data terminal (DP) of the drive circuit.

In the second embodiment, the status detection and response operation may be performed when the decoder unit 20 reaches the EOP field of the data fetch signal or the brightness control signal. For each of the drive circuits (IC1 to ICN), when the status detection unit 26 of the drive circuit detects an internal abnormal situation, the status detection unit 26 of the drive circuit generates and sends a status response signal to the common transceiver terminal 31 of the control circuit 3 via the data terminal (DP) of the drive circuit, the transmission line (D) of the drive circuit, and the control line (CL). At the same time, the control circuit 3 is configured to communicate with the N number of drive circuits (IC1 to ICN) to set a data fetch response time and a status response time for the transmission of the response data packet and the status response signal, respectively. It is noted that operations associated with communication between the control circuit 3 and the N number of drive circuits (IC1 to ICN) to set the data fetch response time and the status response time are well known in the related art, so details thereof are omitted herein for the sake of brevity.

In the second embodiment, the brightness control operation may be performed when all of the drive circuits (IC1 to ICN) are in the transmission state to form the pass-through signal transmission path 7. After the assigned address of each of the N number of drive circuits (IC1 to ICN) is set, the common transceiver terminal 31 of the control circuit 3 transmits the command signal (CTRL) that is the brightness control signal to each of the N number of drive circuits (IC1 to ICN) via the common transmission line (D0) and the pass-through signal transmission path 7. The brightness control signal includes a brightness data packet. The brightness data packet includes X number of brightness data piece(s) that correspond respectively to X number of target address(es) of brightness control, where $1 \leq X \leq N$. The X number of drive circuits among the N number of drive circuits (IC1 to ICN) are configured to read the brightness data piece(s) according to the assigned addresses of the X number of drive circuits. The assigned address(es) of the X number of drive circuits respectively conforming with the target address(es). In detail, for each drive circuit among the N number of drive circuits (IC1 to ICN), the decoder unit 20 decodes the brightness data packet to read one of the brightness data piece(s) that corresponds to one of the target address(es) of brightness control conforming with the assigned address of the drive circuit. Then, the decoder unit 20 sends one of the brightness data piece(s) to the brightness control unit 23. The brightness control unit 23 generates a driving current based on the one of the brightness data piece(s), and sends the driving current to a respective one of the LED groups 4.

In sum, the control system for a light emitting device according to embodiments of the present disclosure uses only the control circuit 3 to transmit data for the address setting operation and the brightness control operation, and to receive data for the status detection and response operation and the data fetch request operation through a single terminal. This configuration does not need a feedback line connected between the $N^{th}$ drive circuit (ICN) and the control circuit 3, effectively reducing wiring complexity. Furthermore, the control circuit 3 only uses the common transceiver terminal 31 to transmit and receive data, which reduces the number of input terminals of the control circuit 3 (e.g., when there are M number of drive circuit strings 51, M number of input terminals may be reduced).

In addition, when the assigned address of an individual drive circuit is set, the state setting of the drive circuit is in the transmission state. As a result, when the state setting of every single one of the N number of drive circuits (IC1 to ICN) is in the transmission state, the pass-through signal transmission path 7 is formed between the common transceiver terminal 31 of the control circuit 3 and the N number of drive circuits (IC1 to ICN). This enables an internal abnormal situation and internal data related to any one of the N number of drive circuits (IC1 to ICN) to be transmitted to the control circuit 3 quickly. Besides that, the pass-through signal transmission path 7 according to the second embodiment enables a brightness control signal to be transmitted to each of the drive circuits (IC1 to ICN) almost simultaneously, which prevents subsequent drive circuits from being unable to update the brightness control setting when CRC verification of any one of the drive circuits (IC1 to ICN) has failed.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for a light emitting device, comprising:

N number of drive circuits connected in series, where N≥2, each of said N number of drive circuits including a first terminal unit, a second terminal unit and a data terminal, said first terminal unit of an $i^{th}$ one of said N number of drive circuits being electrically connected to said second terminal unit of an $(i-1)^{th}$ one of said N number of drive circuits, where 2≤i≤N;

N number of transmission lines electrically connected to said data terminals respectively of said N number of drive circuits;

a common transmission line electrically connected to said first terminal unit of a first one of said N number of drive circuits;

a control line electrically connected to said N number of transmission lines and said common transmission line; and a control circuit including a common transceiver terminal that is electrically connected to said control line and that is configured to output a command signal, the command signal being configured for one of address setting, brightness control and data fetch, the command signal for address setting being configured for sequentially setting assigned addresses respectively for said N number of drive circuits, wherein each of said N number of drive circuits has a state setting operable to switch between a transmission state and a non-transmission state with respect to signal transmission between said first terminal unit and said second terminal unit, and said N number of drive circuits form a pass-through signal transmission path between said first terminal unit of the first one of said N number of drive circuits and said second terminal unit of a last one of said N number of drive circuits when the state setting of every single one of said N number of drive circuits is in the transmission state.

2. The control system as claimed in claim 1, wherein each of said N number of drive circuits includes a decoder unit that is electrically connected to said first terminal unit and said second terminal unit of said drive circuit, and an address control logic unit that is electrically connected to said decoder unit and said second terminal unit of said drive circuit;

wherein, for the first one of said N number of drive circuits, in response to receiving the command signal that is an address setting signal including a preset starting address for address setting, said decoder unit generates and transmits a second-terminal-unit enabling signal to said second terminal unit, and transmits the preset starting address to said address control logic unit, said address control logic unit performs an automatic address setting operation to set the assigned address of the first one of said N number of drive circuits based on the preset starting address, generates a setting address for a second one of said N number of drive circuits, packetizes the setting address for the second one of said N number of drive circuits to generate a first serial address output signal, and transmits the first serial address output signal to said second terminal unit, and said second terminal unit transmits the first serial address output signal to said first terminal unit of the second one of said N number of drive circuits according to the second-terminal-unit enabling signal.

3. The control system as claimed in claim 2, wherein each of said N number of drive circuits further includes a multiplexer that is electrically connected to said first terminal unit of said drive circuit, and a data transmission unit that is electrically connected to said multiplexer and said second terminal unit of said drive circuit; and wherein, for each drive circuit among said N number of drive circuits, when said decoder unit reaches an end-of-packet field of one of a data fetch signal and a brightness control signal while decoding the command signal, said decoder unit generates a first-terminal-unit enabling signal to said first terminal unit of said drive circuit, and controls said multiplexer to transmit a signal received from said data transmission unit to said first terminal unit of said drive circuit.

4. The control system as claimed in claim 3, wherein said first terminal unit of each of said N number of drive circuits includes an input/output (IO) terminal, a first buffer that is electrically connected to said IO terminal and said decoder unit of said drive circuit, and a second buffer that is electrically connected to said IO terminal, said decoder unit and said multiplexer of said drive circuit;

wherein said first buffer is configured for transmitting a signal received from said IO terminal to said decoder unit; and wherein said second buffer is configured for receiving the first-terminal-unit enabling signal from said decoder unit, and for transmitting a signal received from said multiplexer to said IO terminal based on the first-terminal-unit enabling signal.

5. The control system as claimed in claim 3, wherein said second terminal unit of each of said N number of drive circuits includes an IO terminal, a first buffer that is electrically connected to said IO terminal, said address control logic unit and said decoder unit of said drive circuit, and a second buffer that is electrically connected to said IO terminal and said data transmission unit of said drive circuit;

wherein said first buffer is configured for receiving the second-terminal-unit enabling signal from said decoder unit, and for transmitting a signal received from said address control logic unit to said IO terminal based on the second-terminal-unit enabling signal; and wherein said second buffer is configured for transmitting a signal received from said IO terminal to said data transmission unit.

6. The control system as claimed in claim 3, wherein said decoder unit is electrically connected further to said data terminal of said drive circuit, and each of said N number of drive circuits further includes a data fetch unit that is electrically connected to said multiplexer of said drive circuit, and a register that is electrically connected to said data fetch unit of said drive circuit and that is used for storing internal data related to said drive circuit;

wherein said decoder unit is configured to control said data fetch unit to fetch the internal data from said register based on the command signal that includes a data fetch request data packet and that is received from said data terminal;

wherein said data fetch unit is configured to generate a response data packet based on the internal data, and to transmit the response data packet to said multiplexer; and wherein said decoder unit is further configured to control said multiplexer to transmit the response data packet received from said data fetch unit to said first terminal unit of said drive circuit.

7. The control system as claimed in claim 2, wherein said common transceiver terminal of said control circuit is configured to, after the assigned address of each of said N number of drive circuits is set, transmit the command signal that is a brightness control signal to said data terminals of said N number of drive circuits respectively via said N number of transmission lines, the brightness control signal including a brightness data packet, the brightness data packet including X number of brightness data piece(s) that correspond respectively to X number of target address(es) of brightness control, where $1 \leq X \leq N$; and wherein X number of drive circuits among said N number of drive circuits are configured to read the brightness data piece(s) according to the assigned addresses of said X number of drive circuits, the assigned address (es) of said X number of drive circuits respectively conforming with the target address(es).

8. The control system as claimed in claim 7, wherein, for each drive circuit among said N number of drive circuits, said decoder unit of said drive circuit is electrically connected to said data terminal of said drive circuit, and each of said N number of drive circuits further includes a brightness control unit that is electrically connected to said decoder unit; and wherein, for each drive circuit among said N number of drive circuits, said decoder unit is configured to decode the brightness data packet, to read one of the brightness data piece(s) that corresponds to one of the target address(es) conforming with the assigned address of said drive circuit, and to send said one of the brightness data piece(s) to said brightness control unit, and said brightness control unit is configured to generate a driving current based on said one of the brightness data piece(s), and to send the driving current to a light emitting diode group.

9. The control system as claimed in claim 1, wherein each of said N number of drive circuits includes a decoder unit that is electrically connected to said first terminal unit and said second terminal unit of said drive circuit;

wherein for each drive circuit of said N number of drive circuits, when said decoder unit reaches an end-of-packet field of one of a data fetch signal and a brightness control signal, the state setting of said drive circuit is in the transmission state where a signal outputted by said first terminal unit of said drive circuit is received from said second terminal unit of said drive circuit, and has content identical to content of a signal inputted into said second terminal unit of said drive circuit; and wherein the pass-through signal transmission path is formed to allow a signal to be transmitted from the $N^{th}$ one of said N number of drive circuits to the first one of said N number of drive circuits.

10. The control system as claimed in claim 9, wherein said common transceiver terminal of said control circuit is configured to transmit the command signal that includes a data fetch request data packet to said data terminals of said N number of drive circuits respectively via said N number of transmission lines, the data fetch request data packet including a target address of a data fetch that is the assigned address of a designated one of said N number of drive circuits; and wherein said data fetch unit of each of said N number of drive circuits is configured to, when said drive circuit receives the data fetch request data packet and when the assigned address of said drive circuit conforms with the target address of the data fetch, generate and transmit a response data packet to said common transceiver terminal of said control circuit via said first terminal unit of said drive circuit, the pass-through signal transmission path, said common transmission line, and said control line, the response data packet including internal data related to the designated one of said N number of drive circuits.

11. The control system as claimed in claim 9, wherein each of said N number of drive circuits further includes a status detection unit configured to generate a status response signal upon detecting an internal abnormal situation, and to send the status response signal to said control circuit via the pass-through signal transmission path, said common transmission line and said control line.

12. The control system as claimed in claim 1, wherein said common transceiver terminal of said control circuit is configured to transmit the command signal that includes a data fetch request data packet to each of said N number of drive circuits via said common transmission line and the pass-through signal transmission path, the data fetch request data packet including a target address of a data fetch that is the assigned address of a designated one of said N number of drive circuits; and
wherein each of said N number of drive circuits further includes a multiplexer that is electrically connected to said data terminal of said drive circuit, and a data fetch unit that is electrically connected to said multiplexer of said drive circuit and that is configured to, when said drive circuit receives the data fetch request data packet and when the assigned address of said drive circuit conforms with the target address of the data fetch, generate and transmit a response data packet to said common transceiver terminal of said control circuit via said data terminal of said drive circuit, said transmission line of said drive circuit and said control line, the response data packet including internal data related to the designated one of said N number of drive circuits.

13. The control system as claimed in claim 1, wherein each of said N number of drive circuits further includes a status detection unit configured to generate a status response signal upon detecting an internal abnormal situation, and to send the status response signal to said common transceiver terminal of said control circuit via said data terminal of said drive circuit, said transmission line of said drive circuit and said control line.

14. The control system as claimed in claim 1, wherein each of said N number of drive circuits further includes a decoder unit that is electrically connected to said first terminal unit, an address control logic unit that is electrically connected to said decoder unit, a first multiplexer that is electrically connected to said second terminal unit, said decoder unit and said address control logic unit;
wherein, for the first one of said N number of drive circuits,
in response to receiving the command signal that is an address setting signal including a preset starting address for address setting, said decoder unit controls said first multiplexer to transmit a signal received from said address control logic unit to said second terminal unit, and transmits the preset starting address to said address control logic unit,
said address control logic unit performs an automatic address setting operation to set the assigned address of the first one of said N number of drive circuits based on the preset starting address, generates a setting address for a second one of said N number of drive circuits, packetizes the setting address for the second one of said N number of drive circuits to generate a first serial address output signal, and transmits the first serial address output signal to said first multiplexer, and
said decoder unit controls said first multiplexer to transmit the first serial address output signal received from said address control logic unit to said second terminal unit, the first serial address output signal being subsequently transmitted to said first terminal unit of the second one of said N number of drive circuits.

15. The control system as claimed in claim 14, wherein each of said N number of drive circuits further includes a data transmission unit that is electrically connected between said first terminal unit and said first multiplexer of said drive circuit;
wherein said data transmission unit is configured for transmitting a signal received from said first terminal unit to said first multiplexer; and
wherein, for each drive circuit of said N number of drive circuits, said decoder unit is configured to control said first multiplexer to transmit a signal received from said data transmission unit to said second terminal unit of said drive circuit when said drive circuit is in the transmission state.

16. The control system as claimed in claim 14, wherein said common transceiver terminal of said control circuit is configured to, after the assigned address of each of said N number of drive circuits is set, transmit the command signal that is a brightness control signal to each of said N number of drive circuits via said common transmission line and the pass-through signal transmission path, the brightness control signal including a brightness data packet, the brightness data packet including X number of brightness data piece(s) that correspond respectively to X number of target address(es) of brightness control, where 1≤X≤N; and
wherein X number of drive circuits among said N number of drive circuits are configured to read the brightness data piece(s) according to the assigned addresses of said X number of drive circuits, the assigned address(es) of said X number of drive circuits respectively conforming with the target address(es).

17. The control system as claimed in claim 16, wherein each of said N number of drive circuits further includes a brightness control unit that is electrically connected to said decoder unit; and
wherein, for each drive circuit among said N number of drive circuits, said decoder unit is configured to decode the brightness data packet, to read one of the brightness data piece(s) that corresponds to one of the target address(es) of brightness control conforming with the assigned address of said drive circuit, and to send said one of the brightness data piece(s) to said brightness control unit, and said brightness control unit is configured to generate a driving current based on said one of the brightness data piece(s), and to send the driving current to a light emitting diode group.

18. The control system as claimed in claim 14, wherein each of said N number of drive circuits further includes a register configured for storing internal data related to said drive circuit, a data fetch unit that is electrically connected to said register and said decoder unit, and a second multiplexer that is electrically connected to said data fetch unit and said data terminal of said drive circuit;
wherein said decoder unit is configured to control said data fetch unit to fetch the internal data from said register based on the command signal that includes a data fetch request data packet and that is received from said first terminal unit of said drive circuit;

wherein said data fetch unit is configured to generate a response data packet based on the internal data, and to transmit the response data packet to said second multiplexer; and wherein said decoder unit is further configured to control said second multiplexer to transmit the response data packet received from said data fetch unit to said data terminal of said drive circuit.

19. The control system as claimed in claim 1, wherein, for each drive circuit of said N number of drive circuits, when the assigned address of said drive circuit is set, the state setting of said drive circuit is in the transmission state where a signal outputted by said second terminal unit of said drive circuit is received from said first terminal unit of said drive circuit, and has content identical to content of a signal inputted into said first terminal unit of said drive circuit; and wherein the pass-through signal transmission path is formed to allow a signal to be transmitted from the first one of said N number of drive circuits to the $N^{th}$ one of said N number of drive circuits.

20. A light emitting device, comprising:

N number of light emitting diode groups, where N≥2; and a control system including N number of drive circuits, N number of transmission lines, a common transmission line, a control line and a control circuit, said N number of drive circuits being connected in series and being electrically connected respectively to said N number of light emitting diode groups, and each including a first terminal unit, a second terminal unit, and a data terminal, said first terminal unit of an $i^{th}$ one of said N number of drive circuits being electrically connected to said second terminal unit of an $(i-1)^{th}$ one of said N number of drive circuits, where 2≤i≤N, wherein said N number of transmission lines are electrically connected to said data terminals respectively of said N number of drive circuits, said common transmission line is electrically connected to said first terminal unit of a first one of said N number of drive circuits, and said control line is electrically connected to said N number of transmission lines and said common transmission line;

wherein said control circuit includes a common transceiver terminal that is electrically connected to said control line and that is configured to output a command signal, the command signal is configured for address setting, the command signal for address setting is configured for sequentially setting assigned addresses respectively for said N number of drive circuits; and wherein each of said N number of drive circuits has a state setting operable to switch between a transmission state and a non-transmission state with respect to signal transmission between said first terminal unit and said second terminal unit, and for each drive circuit of said N number of drive circuits, when the assigned address of said drive circuit is set, the state setting of said drive circuit is in the transmission state where a signal at said first terminal unit of said drive circuit has content identical to content of a signal at said second terminal unit of said drive circuit.

* * * * *